Sept. 22, 1925.  
W. H. GIBB  
1,554,273  
ELECTRIC SEAM WELDING MACHINE  
Filed May 22, 1922  2 Sheets-Sheet 1

Inventor  
William H. Gibb.

By  
Attorney

Sept. 22, 1925.
W. H. GIBB
1,554,273
ELECTRIC SEAM WELDING MACHINE
Filed May 22, 1922
2 Sheets-Sheet 2

Inventor
William H Gibb.

By Charles E. Visner
Attorney

Patented Sept. 22, 1925.

1,554,273

UNITED STATES PATENT OFFICE.

WILLIAM H. GIBB, OF PLEASANT RIDGE, MICHIGAN, ASSIGNOR TO GIBB INSTRUMENT COMPANY, OF DETROIT, MICHIGAN, A CORPORATION OF PENNSYLVANIA.

ELECTRIC SEAM-WELDING MACHINE.

Application filed May 22, 1922. Serial No. 562,660.

*To all whom it may concern:*

Be it known that I, WILLIAM H. GIBB, a citizen of the United States, residing at Pleasant Ridge, county of Oakland, State of Michigan, have invented a certain new and useful Improvement in Electric Seam-Welding Machines, and declare the following to be a full, clear, and exact description of the same, such as will enable others skilled in the art to which it pertains to make and use the same, reference being had to the accompanying drawings, which form a part of this specification.

This invention relates to electric seam welding machines, and the object is to provide a machine that is rapid in operation and forms an efficient leak-proof joint without liability of arcing or burning the metal at the weld and that is simple in construction. Heretofore in seam welding machines, roller electrodes have been used in which the rollers are rotated uniformly either by hand or automatically but with such method the metal is liable to become torn out of the seam and adhere to the roller or scales from the surface accumulate on the roller resulting in arcing and burning through of the seam. I seek to avoid this difficulty in a manner hereinafter stated. Other types of machines such as what are known as the "roll step" type have been utilized. In the "roll step" device the roller receives an impulse moving the material forward for a step and then comes to a rest and the welding current is switched on bringing the metal beneath the roller to welding heat and it is welded by pressure of the roller. As the roller is again turned the current is automatically switched off. This "roll step" method has the disadvantage of loss of time although curing the defect of the continuous roller machines above mentioned. I have sought to overcome the difficulties of both such previous types of machines avoiding the loss of time of the "roll step" type and the liability of arcing of the continuous roll type and provide a machine for moving the metal continuously thus securing speed and automatically switching the current on and off. During the time the current is on the metal is moved slowly giving the necessary time interval to bring the parts to welding heat and then as the current is cut off rapidly moving the metal thus securing a speed approaching that of the continuous roller type while avoiding the accumulation of scale and of the furrowing of the seam of the "roll step" type due to the fact of the current being switched on and off between welding intervals. These results have been secured by a simple mechanism avoiding stopping and starting of the machine as in the roll step method which subjects the machine to great stresses and excessive wear and substituting therefor a continuously operating mechanism by use of what I have termed a dual speed device which provides comparatively low speed during the welding period and a comparatively high speed at the cessation of the welding and a smooth easy change from one speed to the other. These objects and the several novel features of the invention are hereinafter more fully described and claimed, and one form of construction embodying my invention is shown in the accompanying drawings in which—

Figure 2:
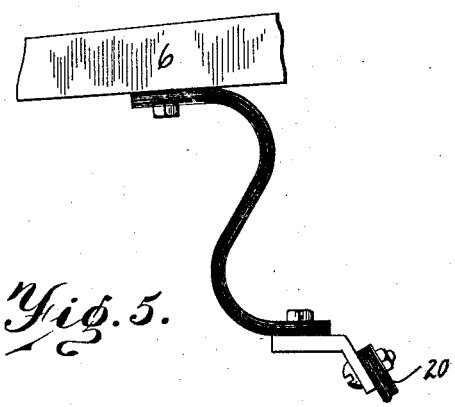
Fig. 2 is a side view thereof.
Figure 6:
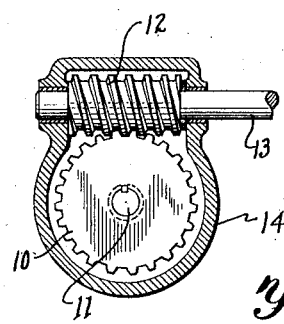
Fig. 6 is a detail showing the housing for the electrode gears.

It is to be understood that the features of my invention, that is, the dual speed and general character of mechanism involved producing the dual speed and switching on and off of the current at the correct intervals etc., may be embodied in machines of various styles and designs for electric welding. I have here illustrated only one type of machine to which my dual speed mechanism is applicable—that is, a machine in which the material being welded is fed straight in toward the machine and is a machine applicable for welding of comparatively short lengths only. It will be readily understood, however, by those familiar with the art that by setting the roller electrodes to operate at a right angle to the position shown in the drawings, seams of much greater length as well as circular seams may be welded. In the machine here shown the body 1 of the machine is in the nature of a casing providing a housing for the usual transformer (not here shown) and this body is supported upon legs 2. On the forward side of the housing is provided the lower electrode arm 3 having a roller 4 at the forward end and, as will be understood from Fig. 2, this electrode arm may be raised or lowered to vary the distance between the roller electrodes when in open position, bolts 5 being provided to permit vertical adjustment of this arm 3. The upper electrode arm 6 is pivoted at 7 on a bracket 8 provided on the upper end of the housing and should be insulated from the housing as should also be the electrode arm 3. The upper electrode arm 6 is also provided with a roller 9 and this roller is driven by means of a worm wheel 10 on the shaft 1 of the roller with which meshes a worm 12 on the worm shaft 13. This worm is supported in a housing 14 loosely mounted on the shaft 1 and a universal joint 15 is provided on the worm shaft, which with the pivotal mounting of the bearing for the worm permits the electrode arm 6 to be turned on its pivot in bringing the upper roller electrode to and from the work. For the purpose of turning the electrode arm 6 I have provided a foot pedal 16 pivotally mounted in the lower part of the framework and on the rear end is provided a rod 16 which extends through an aperture in the rear end of the electrode arm 6. On this rod 16 is a collar 17 and between the collar and end of the electrode arm 6 is a coiled compression spring 18 whereby on downward movement of the arm to welding position a yielding pressure is produced between the electrode rollers 4 and 9.

Figure 5:
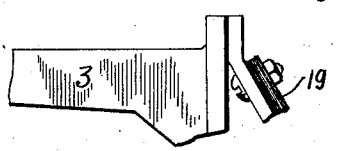
Fig. 5 is a diagram showing the circuit connection for the electrodes.

The above described parts of the mechanism in the main are common in this art as is also a transformer (not here shown). The secondary circuit of the transformer leads by means of the terminal 19 to the lower electrode arm 3 and terminal 20 for the upper electrode arm 6 to the electrode rollers, there being a flexible connection between the terminal 20 and arm 6 as shown in Fig. 5 permitting movement of the said arm.

The shaft 13 for the worm at the rear end is mounted in a bearing 21 and on this shaft is a gear 22 elliptic in form, the shaft passing through one of the foci of the ellipse. This gear meshes with a similar elliptic gear 23 on the drive shaft 24, which shaft may be provided with the coned pulleys 25 by which it may be driven at various speeds. This gear 23 has the shaft passing through one of the foci of the ellipse and the gears are arranged as is usual with gears of this type—that is, as the portion of the gear 23 at the greatest distance from the drive shaft is turned toward the worm shaft the side of the gear 22 which is the shortest distance from the worm shaft is engaged at which period the worm shaft is driven at the highest rate of speed and when the position of the gears is reversed the worm shaft is driven at its slowest speed. This is not the only means by which the dual speed may be obtained but is here shown and described to illustrate means for securing the desired dual speed.

Figure 1:
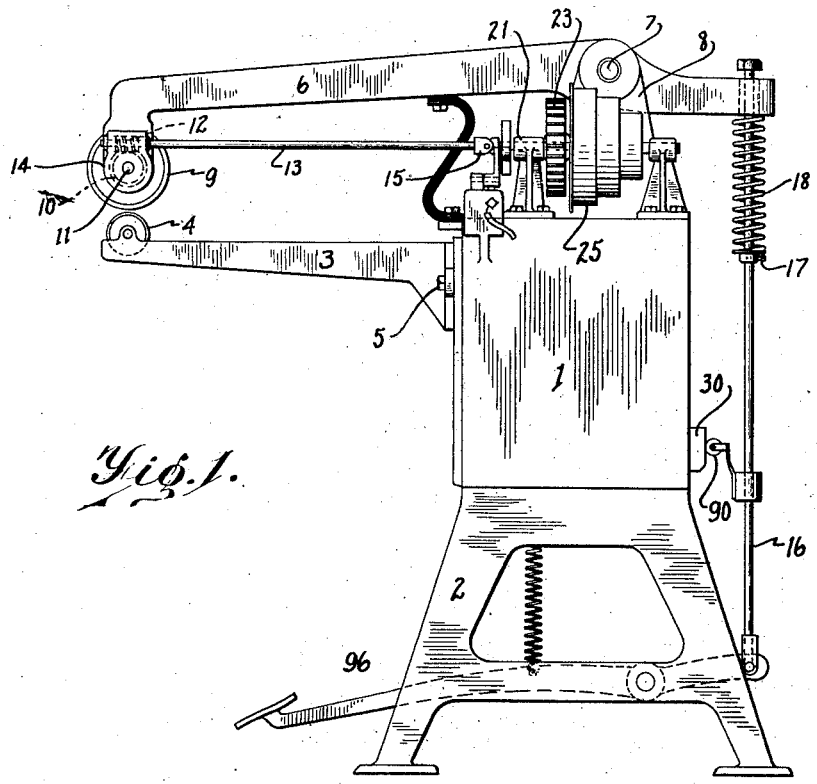
Fig. 1 is a front elevation of the machine embodying my invention.
Figure 4:
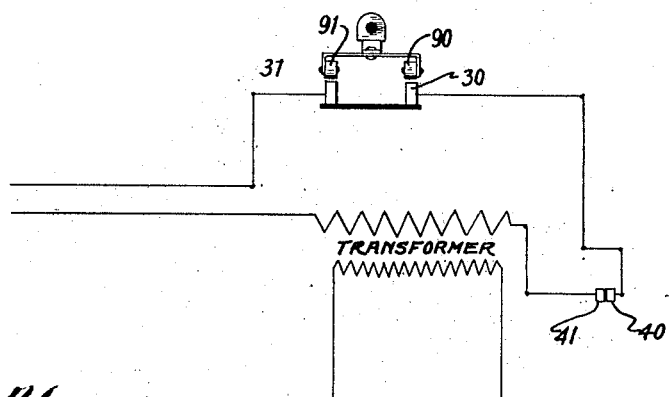
Fig. 4 is a diagram showing the make and break device for the primary circuit.
Figure 3:
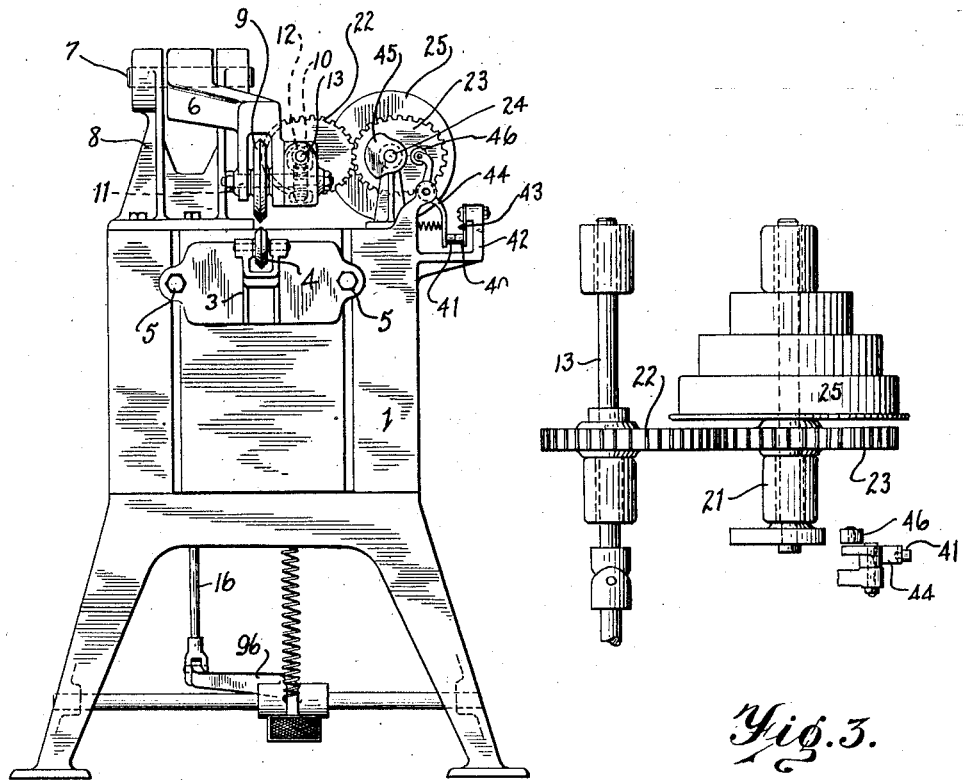
Fig. 3 is a plan view of a gear structure by which the dual speed may be attained.

The welding operation is to be performed during the slow speed movement of the worm shaft—that is, when the upper electrode 9 is moved at its slowest speed and as the gears pass from this position causing slow speed of movement of the upper roller electrode 9 to the period of rapid movement it is necessary that the current be cut off from the electrodes. It is to be noted that the time interval between the high and low speed is very small and the welding spots of the seam are so closely associated that the weld at one spot overlaps that of the preceding area so that a continuous welded seam is formed and with my apparatus a seam that is leak-proof in character having at least ninety-five per cent of the strength of the metal itself is secured. In order that the current may be cut on and off at the correct intervals during operation and in order that when the electrodes are a distance apart all current is cut off I have arranged the primary circuit for the transformer as is indicated diagrammatically in Fig. 4. It is first to be noted that on the rear side of the transformer housing I have provided two contacts 30 and 31 and carried on the rod 16 is a pair of contact rollers 90 and 91 electrically connected together as shown clearly in Fig. 4 and movable up and down with the rod supporting the same. The primary circuit is closed across the two contacts 30 and 31 upon the rollers coming in contact therewith and this is only when the rod 16 is raised to bring the electrode rollers into welding relationship. This primary circuit also continues upward to the contact blocks 40 and 41 carried by a bracket 42 at the upper end of the housing. The contact block 40 is preferably on a leaf spring 43 as shown while the contact spring 41 is on a pivoted lever 44 on the shaft of which is preferably utilized a spring tending to close the contacts. On the shaft of the driving gear 23 is a cam member 45 which extends outward on that side of the shaft on which extends that part of the driving gear at the least distance from the shaft. Thus when the long radius of the driving gear is engaged with the short radius of the driven gear, which is the period of fast movement of the driven gear and worm shaft, this cam contacts the electrode lever 45 breaking the primary circuit and as it passes beyond the roller 46 on the end of the lever the spring closes the contact and completes the circuit which occurs during the slow speed of movement of the worm shaft. By this arrangement the primary circuit is interrupted and although interrupted rapidly it is interrupted for a sufficient period to prevent the roller electrodes from furrowing or tearing the same or carrying the flakes from the surface around the electrode. The welding impulse is thus intermittent but sufficiently rapid to cause the welding areas to overlap.

Manifestly different thicknesses of metal require different speeds of operation and therefore means for changing the speed of operation should be provided which is here shown as a coned pulley but other mechanism may be used for the purpose without departing from the spirit of this invention.

It is to be understood that, as heretofore stated, the dual speed mechanism and corresponding current interruption and various features of the invention as hereinafter claimed may be employed with various types of seam welding machines, the mechanism of which differs somewhat particularly in that with some known machines the electrode roller is rotated to move the work as is the case with the machine herein illustrated and other machines in which the work is directly moved, it not being material whether the contacting electrode be a roller or not, and a third type of machine in which the electrode is moved bodily along the seam. In any of the cases it is evident that the electrode member must traverse the seam and by my invention and in such traverse of the seam by any of the known mechanisms the traverse is made alternately at a low and a high rate of speed with the welding current flowing during the period of slow movement.

From the foregoing description it is evident that the device is comparatively simple and inexpensive in form; that dual speed of movement in traverse of the seam is obtained, and that the current interruption is automatic both as to the welding periods and as to the position of the electrodes, the current being cut off when the electrodes are out of the welding position, and evidently the motion of the parts in change from one speed to the other is without jar, as is occasioned by sudden stopping and starting of the mechanism in other devices, reducing the wear on the machine eliminating strains and stresses, that I have approached if not equaled the speed of the continuous roller type of seam welding machine without the detrimental furrowing or tearing of the seam or arcing in such former types, and that the machine is as readily operated and simple in structure.

Having thus fully described my invention, what I claim is—

1. In an electric seam welding machine, a pair of roller electrodes, automatic means for causing rotation thereof alternately at a high and a low rate of speed, and means for supplying current to the electrodes while turning at the slow speed.

2. In an electric seam welding machine having electrodes contacting the work to be welded, means for causing movement of the material alternately at a comparatively high and a comparatively low rate of speed, and means for supplying electric current to the electrodes during the said slow speed movement.

3. In an electric seam welding machine in which an electrode is utilized to traverse the seam, means for causing the electrode to move alternately at a high and at a low rate of speed, and means for supplying electric current thereto during the slow rate of movement.

4. In an electric seam welding machine, a pair of electrodes for contacting the material to be welded, means for causing movement of the material alternately at a high and a low rate of speed, and means for varying the speed of movement without altering the ratio between the high and low rates of speed.

5. In an electric seam welding machine, a pair of roller electrodes for contacting the material to be welded, a current supply circuit therefor, means for moving the material alternately at a slow and a higher rate of speed, and means for closing the electric circuit during the slow speed movement and breaking the circuit on the high speed movement.

6. In an electric seam welding machine, a pair of roller electrodes, means for causing rotation alternately at a high and low rate of speed, a primary circuit providing a source of current supply for the electrodes, a switch device in the primary circuit, means whereby the switch device is automatically opened during the high speed movement of the roller electrodes and closed during slow speed movement.

7. In an electric seam welding machine, a pair of roller electrodes one of said electrodes being fixed in position and the other electrode movable into and out of contact with the material being welded, an electric circuit for supplying current to the electrodes, means whereby the circuit is broken while the movable electrode is out of engagement with the work and closed when in engagement with the work, means whereby material is moved alternately at a comparatively high and a comparatively low rate of speed, and means for breaking the said circuit during the said high speed movement.

8. In an electric welding machine, a pair of roller electrodes for contacting the material to be welded, a driving shaft for one of the electrodes, means for driving the shaft at a high and a low rate of speed alternately without cessation, and means for supplying current to the electrodes during the slow speed movement only of the driving shaft.

9. In an electric welding machine, a pair of roller electrodes for engaging the material to be welded, a shaft for rotating one of the electrodes and a driving mechanism for the shaft comprising a driving shaft, means for turning the shaft at any one of a number of speeds, means for transmitting the movement to the roller shaft at a high and a low rate of speed alternately, and means for supplying current to the electrodes during the slower of the said two speeds.

10. In an electric seam welding machine, a pair of roller electrodes for contacting the material to be welded, a shaft for driving one of the electrodes, a driving mechanism for the shaft adapted to be driven at one of several shaft speeds, means whereby the motion is transmitted to the roller shaft causing part of each rotation thereof to be of high speed and the remainder of each rotation to be of lower speed, and means for supplying current to the electrodes during each slow period of movement of the roller shaft.

11. In an electric seam welding machine, a pair of roller electrodes for contacting material to be welded, means for driving one of the electrodes comprising a shaft for the electrode, a worm wheel on the shaft, a worm for driving the worm wheel, a worm shaft, means for rotating the worm shaft adapted to cause part of each rotation to be at a high rate of speed and the remainder thereof at a slower rate of speed, and means for supplying current to the electrodes during slow speed movement of the worm shaft.

12. In an electric seam welding machine, a pair of roller electrodes for engaging the material to be welded, a drive shaft for one of the electrodes, the speed of rotation of the roller being materially less than the speed of rotation of the driving shaft therefor, means for rotating the driving shaft in such manner that each revolution thereof is partly at a high and partly the low speed, and means for supplying current to the electrodes during each slow speed movement of the driving shaft.

13. In an electric seam welding machine, a rotatable roller electrode for traversing the seam, automatic means for causing rotation of the roller in periods of alternately high and low rates of speed, means for causing rapid alternations in the rate of speed in comparison to the rate of rotation of the roller, and means for supplying electric current to the electrode during each period of low rate of speed.

14. In an electric seam welding machine, a roller electrode for traversing the seam, means for causing rotation of the roller, means for varying the speed of rotation in periods of a high and a low rate, and means for supplying current to the electrode during each low rate of speed.

15. The method of electrically welding a seam between metal sheets by means of roller electrodes which feed the material therethrough, which consists in causing the rollers to rotate alternately at a high and a low rate of speed while in contact with the material, and passing electric current through the electrodes and the seam while moving at the low rate of speed.

16. The method of electrically welding a seam between metal sheets, which consists in causing the material to be moved while the electrodes are in contact therewith alternately at a high and a low rate of speed, and causing electric current to pass through the electrodes and seam while moving at the low rate of speed.

In testimony whereof, I sign this specification.

WILLIAM H. GIBB.